United States Patent
Zhang et al.

(10) Patent No.: US 12,039,988 B1
(45) Date of Patent: Jul. 16, 2024

(54) HELIUMSPEECH UNSCRAMBLING METHOD AND SYSTEM FOR SATURATION DIVING BASED ON MULTI-OBJECTIVE OPTIMIZATION

(71) Applicant: Nantong University, Nantong (CN)

(72) Inventors: Shibing Zhang, Nantong (CN); Jianrong Wu, Nantong (CN)

( * ) Notice: Subject to any disclaimer, the term of this patent is extended or adjusted under 35 U.S.C. 154(b) by 0 days.

(21) Appl. No.: 18/424,695

(22) Filed: Jan. 26, 2024

Related U.S. Application Data

(63) Continuation of application No. PCT/CN2022/108750, filed on Jul. 28, 2022.

(30) Foreign Application Priority Data

Nov. 16, 2021 (CN) .......................... 202111352115.3

(51) Int. Cl.
| | |
|---|---|
| *G10L 21/02* | (2013.01) |
| *G10L 15/06* | (2013.01) |
| *G10L 15/20* | (2006.01) |
| *G10L 25/51* | (2013.01) |

(52) U.S. Cl.
CPC ............ *G10L 21/02* (2013.01); *G10L 15/063* (2013.01); *G10L 15/20* (2013.01); *G10L 25/51* (2013.01); *G10L 2015/0631* (2013.01)

(58) Field of Classification Search
CPC ....... G10L 21/02; G10L 15/063; G10L 15/20; G10L 25/51; G10L 2015/0631
See application file for complete search history.

(56) References Cited

U.S. PATENT DOCUMENTS

| | | | | |
|---|---|---|---|---|
| 3,632,877 | A * | 1/1972 | Gray ...................... | G10L 21/00 381/54 |
| 3,736,551 | A * | 5/1973 | Hirsch .................... | B63C 11/26 340/407.1 |
| 3,803,363 | A * | 4/1974 | Lee ......................... | G10L 21/00 704/211 |
| 3,816,664 | A * | 6/1974 | Koch .................. | G09B 21/006 704/211 |

(Continued)

FOREIGN PATENT DOCUMENTS

| | | |
|---|---|---|
| CN | 106682574 A | 5/2017 |
| CN | 113178207 A | 7/2021 |

OTHER PUBLICATIONS

Internation Search Report of PCT/CN2022/108750, Mailed Sep. 21, 2022.

*Primary Examiner* — Michael Colucci

(57) ABSTRACT

The present application discloses a method and a system for saturation diving heliumspeech unscrambling based on multi-objective optimization. In a system including a diver and a filter at least, a working language phonetic symbol library and a common working word library for divers are constructed. The divers read them one by one, and a phonetic symbol standard speech library, a phonetic symbol heliumspeech library and a common working word speech library are generated. The filter uses the multi-objective optimization algorithm to design its impulse response coefficients, corrects and unscrambles the tagged and sampled heliumspeech signal word by word, and continuously updates the impulse response coefficients to complete the perfect heliumspeech unscrambling.

13 Claims, 1 Drawing Sheet

(56) References Cited

U.S. PATENT DOCUMENTS

| | | | | |
|---|---|---|---|---|
| 3,863,026 | A | * | 1/1975 | Dildy, Jr. ............... G10L 21/00 704/200 |
| 3,965,298 | A | * | 6/1976 | Carlson ................ G10L 21/00 381/54 |
| 2006/0253278 | A1 | * | 11/2006 | Furst-Yust ............. H04S 1/002 704/209 |
| 2012/0265534 | A1 | * | 10/2012 | Coorman ............ G10L 13/033 704/265 |
| 2022/0319534 | A1 | * | 10/2022 | Krishnan Gorumkonda ............... G06N 3/045 |

* cited by examiner

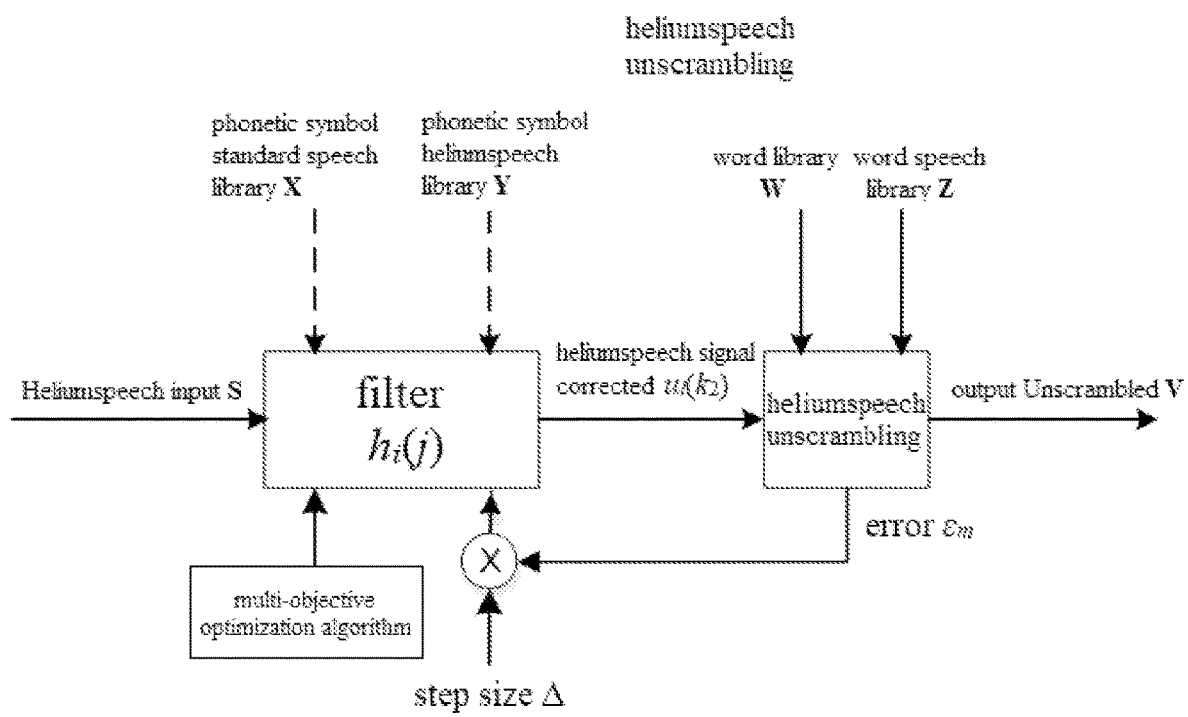

HELIUMSPEECH UNSCRAMBLING METHOD AND SYSTEM FOR SATURATION DIVING BASED ON MULTI-OBJECTIVE OPTIMIZATION

CROSS-REFERENCE TO RELATED APPLICATIONS

This application claims priority to Chinese Patent Application No. 202111352115.3, titled "Heliumspeech Unscrambling Method and System for Saturation Diving Based on Multi-Objective Optimization", filed Nov. 16, 2021, the entire disclosure of which is incorporated herein by reference.

TECHNICAL FIELD

The present application relates to a heliumspeech unscrambling technology, and more particularly to a heliumspeech unscrambling method and system for saturation diving based on multi-objective optimization.

BACKGROUND

The 21$^{st}$ century is the era of ocean economy. More than 50% of the clean energy and production materials of mankind will be obtained from the ocean. Saturation diving has important value in the fields of navigation, marine development, military marine, marine rescue and so on. It is an indispensable part of marine economic development.

Due to the particularity of the deep-sea operation, there are many tasks in the ocean which cannot be completed by manned deep-sea submersibles or underwater robots. Divers are required to directly enter the water and be exposed to the deep-sea high-pressure environment to operate. Due to their physiological requirements in the deep-sea high-pressure environment, divers need to breath the helium-oxygen mixed gas during the saturation diving operation. When the diving operation depth is over 50 m, the voice of the divers is distorted obviously. When the diving operation depth is over 100 m, the voice of the divers begins to be distorted seriously, and a normal speech becomes a bizarre "Donald Duck speech", heliumspeech, which makes it difficult to understand the speech of the divers and results in difficulty in communication between the inside and the outside of a submersible and between the divers. It affects deep-sea operation of the divers directly, and even threatens the lives of divers. Therefore, it is urgent to resolve the voice communication of divers in deep-sea saturation diving, the heliumspeech unscrambling problem.

At present, the existing saturation diving heliumspeech unscramblers unscramble the heliumspeech by manually adjusting the frequency domain or time domain characteristics of the heliumspeech unscramblers in the diving cabin. They cannot adapt to the change of depths of saturation diving operation, and have poor unscrambling performance. When the diving depth is over 200 m, the unscrambling performance of the heliumspeech unscramblers rapidly drops. Particularly, when the diving depth of changes, the heliumspeech of divers cannot be unscrambled effectively. Artificial intelligence-based saturation diving heliumspeech unscrambling technologies are just in its infancy. However, the heliumspeech unscrambling based on machine learning with small sample has a poor effect. How to make full use of the characteristics of limited working vocabularies in saturation diving operation and the personal characteristics of divers' speech to effectively unscramble the heliumspeech, is an unsolved technical difficult.

SUMMARY

The present application aims to solve the difficulties in the above background technology. The present application proposes a method for saturation diving heliumspeech unscrambling based on multi-objective optimization by using the characteristics of limited working vocabularies in saturation diving scenarios and the personal speech characteristics of the divers. The method fully considers the divers' personal speech characteristics and the fact that the working vocabularies in saturation diving are limited, and has strong practicability.

The method of the present application is realized by the following idea. Firstly, an appropriate filter is selected as the filter of a heliumspeech unscrambler, and a working language phonetic symbol library and a commonly used working word library are established according to the working language and specification requirements in saturation diving operation. Secondly, the phonetic symbol library and the commonly used working word library are read by divers under the normal atmospheric pressure and the environment corresponding to saturation diving operation respectively, to generate a phonetic symbol standard speech library, a phonetic symbol heliumspeech library and a commonly used working word speech library. Then, taking a heliumspeech of phonetic symbols of divers as a filter input signal, the filter impulse response coefficients corresponding to each diver are obtained by using the multi-objective optimization algorithm. Finally, the heliumspeech of a diver is tagged and sampled, the impulse response coefficients corresponding to the diver are selected to correct and unscramble the tagged and sampled heliumspeech signal word by word, and at the same time their impulse response coefficients are continuously updated to achieve the complete heliumspeech unscrambling. The method makes full use of the divers' personal speech characteristics and the fact that the working vocabularies in saturation diving are limited, and correct and unscramble the heliumspeech by using the filter based on multi-objective optimization, so as to greatly improve the accuracy of the heliumspeech unscrambling.

The above objective is realized by the following technical solution.

A method for saturation diving heliumspeech unscrambling based on multi-objective optimization, including at least one diver and one filter, and the method for heliumspeech unscrambling includes the following steps:

step 1: selecting a filter structure-selecting an appropriate filter as the filter of a heliumspeech unscrambler;

step 2: constructing a language phonetic symbol library—according to different working languages of the driver for saturation diving, constructing the language phonetic symbol library $P=\{P_n\}$, where n=1, 2, . . . , N, and N is the number of phonetic symbols in the language phonetic symbol library;

step 3: constructing a working word library—according to requirements for the saturation diving operation specification and working languages, constructing the working word library $W=\{w_m\}$ of the diver for the saturation diving operation, where m=1, 2, . . . , M, and M is the number of words in the working word library;

step 4: generating a phonetic symbol standard speech library—under normal atmospheric pressure, the diver i reading phonetic symbols $P_n$ in the language phonetic symbol library P one by one, to obtain a phonetic symbol standard speech signal $x_{i,n}(t_1)$, where i=1, 2, ..., I, $0 \leq t_1 \leq T_1$, I is the number of divers, and $T_1$ is a duration of the phonetic symbol speech signal; and sampling the signal $x_{i,n}(t_1)$ to obtain a discrete signal $x_{i,n}(k_1)$ of $x_{i,n}(t_1)$, to generate the phonetic symbol standard speech library $X=\{x_{i,n}(k_1)\}$, where $k_1=1$, 2, ..., $K_1$, and $K_1$ is a sequence length of the discrete signal $X_{i,n}(k_1)$ of the phonetic symbol standard speech signal;

step 5: generating a working word speech library—under normal atmospheric pressure, the diver i reading words in the working word library W word by word to obtain a working word speech signal $z_{i,m}(t_2)$, where $0 \leq t_2 \leq T_2$, and $T_2$ is a duration of the working word speech signal; and sampling a working word speech signal $z_{i,m}(t_2)$ to obtain a discrete signal $z_{i,m}(k_2)$ of $z_{i,m}(t_2)$, to generate the working word speech library $Z=\{z_{i,m}(k_2)\}$, where $k_2=1, 2, \ldots, K_2$, and $K_2$ is a sequence length of the discrete signal $z_{i,m}(k_2)$ of the working word speech signal;

step 6: generating a phonetic symbol heliumspeech library—under the environment of saturation diving target depth, the diver i reading the phonetic symbols $P_n$ in the phonetic symbol library P one by one to obtain a phonetic symbol heliumspeech signal $y_{i,n}(t_1)$, where $0 \leq t_1 \leq T_1$; and sampling the signal $y_{i,n}(t_1)$ to obtain a discrete signal $y_{i,n}(k_1)$ of the signal $y_{i,n}(t_1)$, to generate the phonetic symbol heliumspeech library $Y=\{y_{i,n}(k_1)\}$;

step 7: determining a filter impulse response coefficient—taking the discrete signal $y_{i,n}(k_1)$ of the heliumspeech phonetic symbol of the diver i at the saturation diving target depth as an input signal of the filter to obtain the filter impulse response coefficient $h_i(j)$ for the diver i at the target depth, so that an error between an output signal $y_{i,n}(k_1)*h_i(k_1)$ of the filter and a corresponding phonetic symbol standard speech signal $x_{i,n}(k_1)$ is minimized, where j=1, 2, ..., J, J is the number of the filter impulse response coefficients, "*" is a convolution operation symbol, and for $k_1>J$, $h_i(k_1)=0$;

step 8: tagging the heliumspeech—the diver i diving to the target depth for saturation diving operation, and tagging and sampling a working speech of the diver i during saturation diving operation word by word to form the tagged heliumspeech signal $S=\{s_l(k_2)\}$, where l=1, 2, ..., L, and L is the number of words in the working heliumspeech of the diver i;

step 9: letting l=1;

step 10: correcting the heliumspeech—selecting the filter impulse response coefficient $h_i(j)$, which is correspond to the diver i and his saturation diving target depth, as the filter impulse response coefficient, and correcting the tagged working heliumspeech signal $s_l(k_2)$ of the diver i to obtain the corrected tagged heliumspeech signal $u_l(k_2)$;

$$u_l(k_2)=s_l(k_2)*h_i(k_2)$$

where "*" is the convolution operation symbol, $k_2=1, 2, \ldots, K_2$, and for $k_2>J$, $h_i(k_2)=0$;

step 11: unscrambling the heliumspeech—comparing the corrected tagged heliumspeech signal $u_l(k_2)$ with the working word speech $z_{i,m}(k_2)$ in the working word speech library Z word by word and calculating an error $\varepsilon_m$ therebetween; and then, taking a working word speech with the smallest error in the working word speech library Z or a word in the working word library W corresponding to the working word speech with the smallest error in the working word speech library Z as an unscrambled output $v_l$ of the heliumspeech; and updating the filter coefficient as follow;

$$h_i(j)=h_i(j)+\Delta \varepsilon_b;$$

where $\Delta$ is an updating step size for the filter coefficient, and $\varepsilon_b$ is the smallest error calculated in the step; and step 12: outputting the heliumspeech—if l is greater than and equal to L, outputting the unscrambled heliumspeech $V=\{v_l\}$ to complete the heliumspeech unscrambling; otherwise, letting l=l+1, and returning to step 10 to continue to correct and unscramble remaining words of the tagged heliumspeech signal S.

The present application further has the following features.

1. In step 7, the filter impulse response coefficient $h_i(j)$ is optimized by using a multi-objective optimization algorithm, which is one of a multi-objective optimization design method based on effective regions, a multi-objective bacterial foraging algorithm or a multi-objective particle swarm optimization algorithm.

2. In step 7, an error between the phonetic symbol standard speech signal $\{x_{i,n}(k_1)\}$ and the corresponding filter output signal $\{y_{i,n}(k_1)*h_i(k_1)\}$ is measured by using a mean square error, to form a multi-objective optimization with N optimization objectives; and the error is measured by using other indexes such as the Euclidean distance, variance and so on.

3. In step 11, the error $\varepsilon_m$ between the corrected tagged heliumspeech signal $u_l(k_2)$ and the working word speech in the working word speech library Z is measured by using the mean square error, the Euclidean distance or variance.

4. Steps 1 to 5 are completed before the diver enters a diving cabin, and steps 6 and 7 are completed during the preparatory work after the diver enters the diving cabin, and steps 8 to 12 are completed in the process of the saturation diving operation of the diver.

The present application further claims to protect a system for saturation diving heliumspeech unscrambling based on multi-objective optimization, which is characterized by that:

a processor and a memory, in which computer-readable instructions are stored, and the computer-readable instructions are executed by the processor, so that the processor executes the above method.

The method of the present application makes use of the divers' personal speech characteristics and the fact that the working vocabularies in saturation diving are limited as well as the induction ability of the multi-objective optimization algorithm in the heliumspeech unscrambling, thereby producing the following beneficial effects.

(1). By learning the working language phonetic symbols of divers, the filter gets rid of the dependence on the number of machine learning samples, so that the performance of the heliumspeech unscrambling can be stabilized.

(2). The filter uses the multi-objective optimization algorithm to design its impulse response coefficients, so that the performance of the heliumspeech unscrambler is always best globally.

(3). The filter impulse response coefficients are corrected and updated continuously during the heliumspeech unscrambling, so the heliumspeech unscrambler is always in the best performance and adaptive to the change of saturation diving depth.

The principle with that filters can adapt the change of saturation diving depth is as follows. From the formation mechanism of the heliumspeech, it is known that the main factors, which result in the speech distortion of saturation divers, are the helium-oxygen mixture gas breathed by the divers and the pressure of the environment where the divers work. When the actual diving depth is different from the target diving depth, there is an error $\varepsilon_m$ to be generated between the corrected heliumspeech signal tagged $u_i(k_2)$, which is corrected by the filter with impulse response coefficients $h_i(j)$ corresponding to the saturation diving operation target depth, and the working word speech library Z. This error will be reduced in the next word by adjusting the filter impulse response coefficients $h_i(j)$, which are used to correct the next word, until the error is close to zero. It ensures that in the heliumspeech unscrambling of step 11, the accurate working word speech or work word is always selected as the heliumspeech unscrambling output, so as to realize the perfect heliumspeech unscrambling.

BRIEF DESCRIPTION OF THE DRAWINGS

FIG. 1 is a flow chart of heliumspeech unscrambling.

DETAILED DESCRIPTION OF THE EMBODIMENTS

The present application will be further described with the accompanying drawings and specific embodiments as follows.

FIG. 1 shows the method flow chart of the present application for saturation diving heliumspeech unscrambling based on multi-objective optimization. The method for heliumspeech unscrambling includes the following steps.

Step 1: selecting a filter structure-selecting an appropriate filter as the filter of a heliumspeech unscrambler.

In the example, a FIR filter with 15 impulse response coefficients is selected as the filter of the heliumspeech unscrambler. An IIR filter, matched filter or Wiener filter can also be selected as the filter. The number of impulse response coefficients can be set according to actual situations, and generally is set to be 11 to 21.

Step 2: constructing a language phonetic symbol library—according to different working languages of the driver for saturation diving, constructing the language phonetic symbol library $P=\{P_n\}$, where n=1, 2, . . . , N, and N is the number of phonetic symbols in the language phonetic symbol library.

In the example, English is selected as the saturation diving working language for divers. The phonetic symbol library P 48 phonetic symbols, which includes 20 vowels and 28 consonants, and N=48. The phonetic symbol library P constructed is built according to the working language of divers, and different working language has different language phonetic symbol library P.

Step 3: constructing a working word library—according to requirements for the saturation diving operation specification and working languages, constructing the working word library $W=\{w_m\}$ of the diver for the saturation diving operation, where m=1, 2, . . . , M, and M is the number of words in the working word library.

In the example, according to the requirements for XX Salvage Company's saturation diving operation specification, a common saturation diving working word library W, which consist of 500 words such as "Ship, Cabin, Deck, Sea, Water, Temperature, on, I, Pressure" and so on, is constructed, where M=500. The common working word library W constructed is set according to the working language of divers and the saturation diving operation specification. Different working language has different unit of the words to be construct the common word library W and different size of the common working word library W constructed.

Step 4: generating a phonetic symbol standard speech library—under normal atmospheric pressure, the diver i reading phonetic symbols $P_n$ in the language phonetic symbol library P one by one, to obtain a phonetic symbol standard speech signal $x_{i,n}(t_1)$, where i=1, 2, . . . , I, $0 \le t_1 \le T_1$, I is the number of divers, and $T_1$ is a duration of the phonetic symbol speech signal; and sampling the signal $x_{i,n}(t_1)$ to obtain a discrete signal $x_{i,n}(k_1)$ of $x_{i,n}(t_1)$, to generate the phonetic symbol standard speech library $X=\{x_{i,n}(k_1)\}$, where $k_1$=1, 2, . . . , $K_1$, and $K_1$ is a sequence length of the discrete signal $x_{i,n}(k_1)$ of the phonetic symbol standard speech signal.

In the example, the duration $T_1$ of the phonetic symbol speech signal is 1 second. The two divers read the phonetic symbols $P_1$ to $P_{48}$ in the phonetic symbol library P respectively one by one to obtain the phonetic symbol standard speech signal sets $\{x_{1,n}(t_1)\}$ and $\{x_{2,n}(t_1)\}$. After the phonetic symbol standard speech signal sets $\{x_{1,n}(t_1)\}$ and $\{x_{2,n}(t_1)\}$ are sampled in 8000 Hz, the phonetic symbol standard speech discrete signal sets $\{x_{1,n}(k_1)\}$ and $\{x_{2,n}(k_1)\}$ are obtained, where n=1, 2, . . . , 48, and $k_1$=1, 2, . . . , 8000.

Step 5: generating a working word speech library—under normal atmospheric pressure, the diver i reading words in the working word library W word by word to obtain a working word speech signal $z_{i,m}(t_2)$, where $0 \le t_2 \le T_2$, and $T_2$ is a duration of the working word speech signal; and sampling a working word speech signal $z_{i,m}(t_2)$ to obtain a discrete signal $z_{i,m}(k_2)$ of $z_{i,m}(t_2)$, to generate the working word speech library $Z=\{z_{i,m}(k_2)\}$, where $k_2$=1, 2, . . . , $K_2$, and $K_2$ is a sequence length of the discrete signal $z_{i,m}(k_2)$ of the working word speech signal.

In the example, the duration $T_2$ of word speech signal is 2 seconds. The two divers read the words in the word library W respectively word by word to obtain the single-word speech signal sets $\{z_{1,m}(t_2)\}$ and $\{z_{2,m}(t_2)\}$. After they are sampled at 8000 Hz, the word speech discrete signal sets $\{z_{1,m}(k_2)\}$ and $\{z_{2,m}(k_2)\}$ are generated, where m=1, 2, . . . , 500, and $k_2$=1, 2, . . . , 16000.

In steps 4 and 5, each diver has a corresponding phonetic symbol standard speech library and a corresponding working word speech library. Different divers have different phonetic symbol standard speech and different working word speech due to their different personal pronunciations. The time $T_1$ for divers to read the phonetic symbols and the time $T_2$ for divers to read the words are determined according to the characteristics of the working languages selected by divers. Different working languages have different time $T_1$ for reading phonetic symbols and different time $T_2$ for reading words.

Step 6: generating a phonetic symbol heliumspeech library—under the environment of saturation diving target depth, the diver i reading the phonetic symbols $P_n$ in the phonetic symbol library P one by one to obtain a phonetic symbol heliumspeech signal $y_{i,n}(t_1)$, where $0 \le t_1 \le T_1$; and sampling the signal $y_{i,n}(t_1)$ to obtain a discrete signal $y_{i,n}(k_1)$ of the signal $y_{i,n}(t_1)$, to generate the phonetic symbol heliumspeech library $Y=\{y_{i,n}(k_1)\}$.

In the example, the preset saturation diving operation depth is 200 meters. Thus, under the environment corresponding to the 200 meter saturation diving operation depth, two divers read the phonetic symbols $P_1$ to $P_{48}$ in the phonetic symbol library P respectively one by one with 1 second duration $T_1$ of the phonetic symbol speech signal, so as to obtain the phonetic symbol heliumspeech signal sets $\{y_{1,n}(t_1)\}$ and $\{y_{2,n}(t_1)\}$. After they are sampled in 8000 Hz, the phonetic symbol heliumspeech discrete sets $\{y_{1,n}(k_1)\}$ and $\{y_{2,n}(k_1)\}$ are generated, where n=1, 2, ..., 48, and $k_1$=1, 2, ..., 8000.

The heliumspeech distortion of divers is corresponding to the specific saturation diving operation depth. Different saturation diving operation depths make divers in different environments, which result in different pronunciations of divers, thereby generate different phonetic symbol heliumspeech signals. Therefore, if there are multiple saturation diving target depths, in step 6, there are multiple phonetic symbol heliumspeech libraries, which is corresponding respectively to the saturation diving target depths, for each diver i, and correspondingly, there are multiple filter impulse response coefficients $h_i(j)$ corresponding respectively to the saturation diving target depths in step 7.

Step 7: determining a filter impulse response coefficient—taking the discrete signal $y_{i,n}(k_1)$ of the heliumspeech phonetic symbol of the diver i at the saturation diving target depth as an input signal of the filter to obtain the filter impulse response coefficient $h_i(j)$ for the diver i at the target depth, so that an error between an output signal $y_{i,n}(k_1)*h_i(k_1)$ of the filter and a corresponding phonetic symbol standard speech signal $x_{i,n}(k_1)$ is minimized, where j=1, 2, ..., J, J is the number of the filter impulse response coefficients, "*" is a convolution operation symbol, and for $k_1>J$, $h_i(k_1)=0$.

In the present application, the impulse response coefficient $h_i(j)$ of the filter is set by using the multi-objective optimization algorithm, which is one of the multi-objective optimization design method based on effective regions, the multi-objective bacterial foraging algorithm or the multi-objective particle swarm optimization algorithm.

In the example, the error between the phonetic symbol standard speech signal $\{x_{i,n}(k_1)\}$ and the corresponding filter output signal $\{y_{i,n}(k_1)*h(k_1)\}$ is measured by using the mean square error (can also be measured by using the Euclidean distance or variance), to form the multi-objective optimization function with N optimization objectives as follows:

$$\text{Min}\{\Sigma_{k_1}[x_{i,1}(k_1)-y_{i,1}(k_1)*h_i(k_1)]^2\}$$

$$\text{Min}\{\Sigma_{k_1}[x_{i,2}(k_1)-y_{i,2}(k_1)*h_i(k_1)]^2\}$$

$$\text{Min}\{\Sigma_{k_1}[x_{i,N}(k_1)-y_{i,N}(k_1)*h_i(k_1)]^2\}$$

where, $k_1$ changes from 1 to $K_1$, "*" is the convolution operation symbol, and for $k_1>J$, $h_i(k_1)=0$.

In the example, the optimization objectives of the filter impulse response coefficients for the diver 1 and the diver 2 are respectively as follows:

$$\text{Min}\{\Sigma_{k_1}[x_{1,1}(k_1)-y_{1,1}(k_1)*h_1(k_1)]^2\}$$

$$\text{Min}\{\Sigma_{k_1}[x_{1,2}(k_1)-y_{1,2}(k_1)*h_1(k_1)]^2\}$$

$$\text{Min}\{\Sigma_{k_1}[x_{1,48}(k_1)-y_{1,48}(k_1)*h_1(k_1)]^2\}$$

and $$\text{Min}\{\Sigma_{k_1}[x_{2,1}(k_1)-y_{2,1}(k_1)*h_2(k_1)]^2\}$$

$$\text{Min}\{\Sigma_{k_1}[x_{2,2}(k_1)-y_{2,2}(k_1)*h_2(k_1)]^2\}$$

$$\text{Min}\{\Sigma_{k_1}[x_{2,48}(k_1)-y_{2,48}(k_1)*h_2(k_1)]^2\}$$

where, $k_1$ changes from 1 to 8000, there are 48 sub-optimization objectives in each optimization objective, and for $k_1>15$, $h_1(k_1)=0$, and $h_2(k_1)=0$.

Step 8: tagging the heliumspeech—the diver i diving to the target depth for saturation diving operation, and tagging and sampling a working speech of the diver i during saturation diving operation word by word to form the tagged heliumspeech signal $S=\{s_l(k_2)\}$, where l=1, 2, ..., L, and L is the number of words in the working heliumspeech of the diver i.

In the example, it is assumed that the diving operator is diver 1, and the working speech of the diver 1 is "I am on deck", which contains 4 words, and namely L=4. The working speech "I am on deck" is tagged word by word with 2 second duration, each word is sampled with 8000 Hz. Then, the heliumspeech signal tagged $S=\{s_l(k_2)\}$ is formed, where l=1, 2, ..., 4, and $k_2$=1, 2, ..., 16000.

Step 9: letting l=1, and starting the loop to perform the heliumspeech unscrambling word by word.

Step 10: correcting the heliumspeech-selecting the filter impulse response coefficient $h_i(j)$, which is correspond to the diver i and his saturation diving target depth, as the filter impulse response coefficient, and correcting the tagged working heliumspeech signal $s_l(k_2)$ of the diver i to obtain the corrected tagged heliumspeech signal $u_l(k_2)$, $$u_l(k_2)=s_l(k_2)*h_i(k_2):$$

where "*" is the convolution operation symbol, $k_2$=1, 2, ..., $K_2$, and for $k_2>J$, $h_i(k_2)=0$.

In the example, the filter selects $h_1(j)$ as its impulse response coefficient, where j=1, 2, ..., 15, and the working heliumspeech signal tagged $s_l(k_2)$ of the diver 1 is corrected to obtain the heliumspeech signal corrected $u_l(k_2)$ $$u_l(k_2)=s_1(k_2)*h_1(k_2);$$

where, for k>15, $h_1(k_2)=0$.

Step 11: unscrambling the heliumspeech—comparing the corrected tagged heliumspeech signal $u_l(k_2)$ with the working word speech $z_{i,m}(k_2)$ in the working word speech library Z word by word and calculating the error $\varepsilon_m$ therebetween. In the example, the mean square error is used to measure the error $\varepsilon_m$. Of course, the Euclidean distance or variance can be also used to measure the error $\varepsilon_m$. The mean square error is calculated as follow:

$$\varepsilon_m=\text{sqrt}\{\Sigma_{k_2}[z_{i,m}(k_2)-u_l(k_2)]^2\}$$

where "sqrt" is the square root function, and $k_2$ changes from 1 to $K_2$, m=1, 2, ..., M.

The working word speech with the smallest error in the working word speech library Z is taken as the output unscrambled; at the same time, the filter coefficients are updated as follows:

$$h_i(j)=h_i(j)+\Delta_{\varepsilon_b}$$

where $\Delta$ is the updating step size for the filter coefficients, and $\varepsilon_b$ is the smallest error calculated in the step 11 The update step size $\Delta$ for the impulse response coefficient $h_i(j)$ should be appropriate. If the update step size is too large, the performance of the heliumspeech unscrambler cannot converge to the best state; if the update step size is too small, the speed, with which the heliumspeech unscrambler converge to the best state, is too slow. It will affect the unscrambling effect of the heliumspeech unscrambler.

In the example, the amplitudes of the corrected heliumspeech signal $u_l(k_2)$ and the working word speech $z_{i,m}(k_2)$ are normalized firstly, and then the mean square error $\varepsilon_m$ between them is calculated, where m=1, 2, ..., 500. Of course, the power normalization or energy normalization can also be used as the normalization. In the loop of l=1, $\varepsilon_8$ is the smallest, the $8^{th}$ word in the corresponding working language word library W is "I", and "I" is taken as the output unscrambled, and namely $v_l$="I". At the same time, the filter coefficients are updated with the update step size Δ=0.00001, that is, $$h(j)=h_i(j)+0.00001\varepsilon_8$$

where j=1,2, ..., 15.

In the embodiment, the output unscrambled $v_l$ is speech. Besides, the words in the working language word library W can be directly output because there are one-to-one correspondence between the words in the working language word library W and the speech in the working word speech library Z. The words are directly output specifically by comparing the heliumspeech signal corrected $u_l(k_2)$ with the working word speech $z_{i,m}(k_2)$ in the working word speech library Z one by one and calculating the error $\varepsilon_m$ between them, and taking the word in the working word library W corresponding to the working word speech with the smallest error in the working word speech library Z as the output $v_l$.

Step 12: outputting the heliumspeech—if l≥L, outputting the unscrambled heliumspeech V={$v_l$} to complete the heliumspeech unscrambling; otherwise, letting l=l+1, and returning to step 10 to continue to correct and unscramble the remaining words of the tagged heliumspeech signal S.

In the example, if l>L=4, output the unscrambled heliumspeech V={$v_l$}, where l=1, 2, ..., 4, to complete the heliumspeech unscrambling; otherwise, let l=l+1, and return to step 10 to continue to correct and unscramble the remaining words of the heliumspeech signal tagged S word by word.

In the method of the present application, steps 1 to 5 are completed before the divers enter a diving cabin, steps 6 and 7 are completed during the preparatory work after the divers enter the diving cabin (generally speaking, the diving operation preparatory work after the divers enter the diving cabin usually lasts 3 to 5 days), and steps 8 to 12 are completed in the saturation diving operation process of the divers.

In addition, the present application relates to a system for saturation diving heliumspeech unscrambling based on multi-objective optimization, which comprises a processor and a memory in which computer-readable instructions are stored. The computer-readable instructions are executed by the processor, so that the processor executes the above method of saturation diving heliumspeech unscrambling based on multi-objective optimization.

In addition, the present application relates to a computer-readable storage medium in which computer-readable instructions are stored. The computer-readable instructions are executed by a processor, so that the processor executes the above method of saturation diving heliumspeech unscrambling based on multi-objective optimization.

In addition to the above embodiments, the present application can have other embodiment modes. All technical solutions formed by equivalent substitution or equivalent transformation fall within the protection scope claimed by the present application.

The invention claimed is:

1. A method for saturation diving heliumspeech unscrambling based on multi-objective optimization, comprising at least one diver and one filter, wherein the method comprises:

step 1: selecting a filter structure—selecting an appropriate filter as the filter of a heliumspeech unscrambler;

step 2: constructing a language phonetic symbol library—according to different working languages of the driver for saturation diving, constructing the language phonetic symbol library P={$P_n$}, where n=1, 2, ..., N, and N is the number of phonetic symbols in the language phonetic symbol library;

step 3: constructing a working word library—according to requirements for the saturation diving operation specification and working languages, constructing the working word library W={$w_m$} of the diver for the saturation diving operation, where m=1, 2, ..., M, and M is the number of words in the working word library;

step 4: generating a phonetic symbol standard speech library—under normal atmospheric pressure, the diver i reading phonetic symbols $P_n$ in the language phonetic symbol library P one by one, to obtain a phonetic symbol standard speech signal $x_{i,n}(t_1)$, where i=1, 2, ..., I, 0≤$t_1$≤$T_1$, I is the number of divers, and $T_1$ is a duration of the phonetic symbol speech signal; and sampling the signal $x_{i,n}(t_1)$ to obtain a discrete signal $x_{i,n}(k_1)$ of $x_{i,n}(t_1)$, to generate the phonetic symbol standard speech library X={$x_{i,n}(k_1)$}, where $k_1$=1, 2, ..., $K_1$, and $K_1$ is a sequence length of the discrete signal $x_{i,n}(k_1)$ of the phonetic symbol standard speech signal;

step 5: generating a working word speech library—under normal atmospheric pressure, the diver i reading words in the working word library W word by word to obtain a working word speech signal $z_{i,m}(t_2)$, where 0≤$t_2$≤$T_2$, and $T_2$ is a duration of the working word speech signal; and sampling a working word speech signal $z_{i,m}(t_2)$ to obtain a discrete signal $z_{i,m}(k_2)$ of $z_{i,m}(t_2)$, to generate the working word speech library Z={$z_{i,m}(k_2)$}, where $k_2$=1, 2, ..., $K_2$, and $K_2$ is a sequence length of the discrete signal $z_{i,m}(k_2)$ of the working word speech signal;

step 6: generating a phonetic symbol heliumspeech library—under the environment of saturation diving target depth, the diver i reading the phonetic symbols $P_n$ in the phonetic symbol library P one by one to obtain a phonetic symbol heliumspeech signal $y_{i,n}(t_1)$, where 0≤$t_1$≤$T_1$; and sampling the signal $y_{i,n}(t_1)$ to obtain a discrete signal $y_{i,n}(k_1)$ of the signal $y_{i,n}(t_1)$, to generate the phonetic symbol heliumspeech library Y={$y_{i,n}(k_1)$};

step 7: determining a filter impulse response coefficient—taking the discrete signal $y_{i,n}(k_1)$ of the heliumspeech phonetic symbol of the diver i at the saturation diving target depth as an input signal of the filter to obtain the filter impulse response coefficient $h_i(j)$ for the diver i at the target depth, so that an error between an output signal $y_{i,n}(k_1)*h_i(k_1)$ of the filter and a corresponding phonetic symbol standard speech signal $x_{i,n}(k_1)$ is minimized, where j=1, 2, ..., J, J is the number of the filter impulse response coefficients, "*" is a convolution operation symbol, and for $k_1$>J, $h_i(k_1)$=0;

step 8: tagging the heliumspeech—the diver i diving to the target depth for saturation diving operation, and tagging and sampling a working speech of the diver i during saturation diving operation word by word to form the tagged heliumspeech signal S={$s_l(k_2)$}, where l=1, 2, ..., L, and L is the number of words in the working heliumspeech of the diver i;

step 9: letting l=1;

step 10: correcting the heliumspeech—selecting the filter impulse response coefficient $h_i(j)$, which is correspond to the diver i and his saturation diving target depth, as the filter impulse response coefficient, and correcting the tagged working heliumspeech signal $s_l(k_2)$ of the diver i to obtain the corrected tagged heliumspeech signal $u_l(k_2)$, $$u_l(k_2)=s_l(k_2)*h_i(k_2);$$

where "*" is the convolution operation symbol, $k_2=1, 2, \ldots, K_2$, and for $k_2>J$, $h_i(k_2)=0$;

step 11: unscrambling the heliumspeech—comparing the corrected tagged heliumspeech signal $u_l(k_2)$ with the working word speech $z_{i,m}(k_2)$ in the working word speech library Z word by word and calculating an error $\varepsilon_m$ therebetween; and then, taking a working word speech with the smallest error in the working word speech library Z or a word in the working word library W corresponding to the working word speech with the smallest error in the working word speech library Z as an unscrambled output vi of the heliumspeech; and updating the filter coefficient as follow:

$$h_i(j)=h_i(j)+\Delta\varepsilon_b;$$

where $\Delta$ is an updating step size for the filter coefficient, and $\varepsilon_b$ is the smallest error calculated in the step; and step 12: outputting the heliumspeech—if l is greater than and equal to L, outputting the unscrambled heliumspeech $V=\{v_l\}$ to complete the heliumspeech unscrambling; otherwise, letting $l=l+1$, and returning to step 10 to continue to correct and unscramble remaining words of the tagged heliumspeech signal S.

2. The method for saturation diving heliumspeech unscrambling based on multi-objective optimization according to claim 1, wherein the filter is one of a FIR filter, IIR filter, matched filter or Wiener filter.

3. The method for saturation diving heliumspeech unscrambling based on multi-objective optimization according to claim 1, wherein in steps 4 and 5, the duration $T_1$ for the diver to read the phonetic symbol and the duration $T_2$ for the diver to read the word are determined according to the working language selected by the diver.

4. The method for saturation diving heliumspeech unscrambling based on multi-objective optimization according to claim 1, wherein if there are multiple saturation diving operation target depths, multiple phonetic symbol heliumspeech libraries corresponding respectively to the saturation diving operation target depths are constructed for each diver i in step 6, and multiple filter impulse response coefficients $h_i(j)$ corresponding respectively to the saturation diving operation target depths are obtained in step 7.

5. The method for saturation diving heliumspeech unscrambling based on multi-objective optimization according to claim 1, wherein in step 7, the filter impulse response coefficient $h_i(j)$ is optimized by using a multi-objective optimization algorithm, which is one of a multi-objective optimization method based on effective regions, a multi-objective bacterial foraging algorithm or a multi-objective particle swarm algorithm.

6. The method for saturation diving heliumspeech unscrambling based on multi-objective optimization according to claim 1, wherein in step 7, the error between the phonetic symbol standard speech signal $\{x_{i,n}(k_1)\}$ and the corresponding filter output signal $\{y_{i,n}(k_1)*h_i(k_1)\}$ is measured by a mean square error, to form a multi-objective optimization function of N optimization objectives as follows:

$$\text{Min}\{\Sigma_{k1}[x_{i,1}(k_1)-y_{i,1}(k_1)*h_i(k_1)]^2\}$$

$$\text{Min}\{\Sigma_{k1}[x_{i,2}(k_1)-y_{i,2}(k_1)*h_i(k_1)]^2\}$$

$$\text{Min}\{\Sigma_{k1}[x_{i,2}(k_1)-y_{i,N}(k_1)*h_i(k_1)]^2\}$$

where, $k_1$ changes from 1 to $K_1$, "*" is the convolution operation symbol, and when $k_1>J$, $h_i(k_1)=0$.

7. The method for saturation diving heliumspeech unscrambling based on multi-objective optimization according to claim 1, wherein in step 7, the error between the phonetic symbol standard speech signal $\{x_{i,n}(k_1)\}$ and the corresponding filter output signal $\{y_{i,n}(k_1)*h_i(k_1)\}$ can also be measured by the Euclidean distance or variance.

8. The method for saturation diving heliumspeech unscrambling based on multi-objective optimization according to claim 1, wherein in step 11, the tagged heliumspeech signal $u_l(k_2)$ and the working word speech $z_{i,m}(k_2)$ is normalized before being compared.

9. The method for saturation diving heliumspeech unscrambling based on multi-objective optimization according to claim 8, wherein the normalization is one of a power normalization method, energy normalization method or amplitude normalization method.

10. The method for saturation diving heliumspeech unscrambling based on multi-objective optimization according to claim 1, wherein in step 11, the error $\varepsilon_m$ between the corrected tagged heliumspeech signal $u_l(k_2)$ and the working word speech in the working word speech library Z is measured by the mean square error which is calculated by the following:

$$\varepsilon_m=\text{sqrt}\{\Sigma_{k2}[z_{i,m}(k_2)-u_l(k_2)]^2\}$$

where "sqrt" is a square root function, and $k_2$ changes from 1 to $K_2$, $m=1, 2, \ldots, M$.

11. The method for saturation diving heliumspeech unscrambling based on multi-objective optimization according to claim 1, wherein steps 1 to 5 are completed before the diver enters a diving cabin, steps 6 and 7 are completed during a preparatory work after the diver enters the diving cabin, and steps 8 to 12 are completed in the process of the saturation diving operation.

12. A system for saturation diving heliumspeech unscrambling based on multi-objective optimization, comprising:
a processor; and a memory in which computer-readable instructions are stored, and the computer-readable instructions are executed by the processor, so that the processor executes the method according to claim 1.

13. A computer-readable storage medium, in which computer-readable instructions are stored, wherein the computer-readable instructions are executed by a processor, so that the processor executes the method according to claim 1.

* * * * *